US012574630B2

(12) United States Patent
Sung et al.

(10) Patent No.: US 12,574,630 B2
(45) Date of Patent: Mar. 10, 2026

(54) ELECTRONIC DEVICE COMPRISING CAMERA, AND OPERATING METHOD FOR ELECTRONIC DEVICE

(71) Applicant: SAMSUNG ELECTRONICS CO., LTD., Suwon-si (KR)

(72) Inventors: Kisuk Sung, Suwon-si (KR); Saetek Oh, Suwon-si (KR); Kihuk Lee, Suwon-si (KR); Jaehyeok Choi, Suwon-si (KR); Sungoh Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 187 days.

(21) Appl. No.: 18/379,521

(22) Filed: Oct. 12, 2023

(65) Prior Publication Data

US 2024/0040241 A1 Feb. 1, 2024

Related U.S. Application Data

(63) Continuation of application No. PCT/KR2022/005253, filed on Apr. 12, 2022.

(30) Foreign Application Priority Data

Apr. 12, 2021 (KR) ........................ 10-2021-0047313

(51) Int. Cl.
*H04N 23/60* (2023.01)
*G09G 3/20* (2006.01)
(Continued)

(52) U.S. Cl.
CPC ........... *H04N 23/64* (2023.01); *G09G 3/2092* (2013.01); *H04N 23/57* (2023.01); *H04N 23/63* (2023.01); *H04N 23/75* (2023.01)

(58) Field of Classification Search
CPC ........ H04N 23/64; H04N 23/57; H04N 23/63; H04N 23/75; H04N 23/72; H04N 23/60;
(Continued)

(56) References Cited

U.S. PATENT DOCUMENTS 6,597,378 B1 7/2003 Shiraishi et al.
9,057,931 B1 * 6/2015 Baldwin ................ G03B 17/48
(Continued)

FOREIGN PATENT DOCUMENTS

JP 2000-10145 A 1/2000
JP 2018-101916 A 6/2018
(Continued)

OTHER PUBLICATIONS

International Search Report and Written Opinion dated Jul. 12, 2022 issued by the International Searching Authority in Application No. PCT/KR2222/005253.
(Continued)

*Primary Examiner* — Timothy J Henn
(74) *Attorney, Agent, or Firm* — Sughrue Mion, PLLC

(57) ABSTRACT

An electronic device includes: a display; a camera; and a processor is configured to execute the instructions to: based on receiving a request to photograph an image using the camera in a state in which the display is driven, set a priority of the display and the camera; identify a shutter speed included in camera driving information set in the camera and an off-duty time in a duty cycle set in the display; based on the priority of the camera being set higher than the priority of the display and the shutter speed being identified to be longer than the off-duty time, adjust at least one of display driving information of the display or the camera driving information of the camera; and control to photograph an
(Continued)

image within an off-duty time that has changed based on the adjusted at least one of the display driving information or the camera driving information.

20 Claims, 11 Drawing Sheets

(51) Int. Cl.
| | |
|---|---|
| *H04N 23/57* | (2023.01) |
| *H04N 23/63* | (2023.01) |
| *H04N 23/75* | (2023.01) |

(58) Field of Classification Search
CPC .... H04N 23/62; H04N 23/631; H04N 23/633; H04N 23/73; G09G 3/2092; G09G 2310/08; G09G 2340/14; G09G 3/20; H04M 1/0266; H04M 2250/52; H04M 1/0264; H04M 1/72454; G06F 3/147
See application file for complete search history.

(56) References Cited

U.S. PATENT DOCUMENTS

| | | | |
|---|---|---|---|
| 10,768,356 B1 | 9/2020 | Zhang et al. | |
| 2007/0002130 A1 | 1/2007 | Hartkop | |
| 2008/0165267 A1* | 7/2008 | Cok | H04N 7/144 |
| | | | 348/E5.022 |
| 2009/0102763 A1 | 4/2009 | Border et al. | |
| 2012/0162490 A1* | 6/2012 | Chung | H04N 23/631 |
| | | | 348/E5.037 |
| 2015/0049165 A1 | 2/2015 | Choi | |
| 2019/0158713 A1* | 5/2019 | McMillan | H04N 7/142 |
| 2019/0379837 A1 | 12/2019 | Kim et al. | |
| 2020/0074959 A1 | 3/2020 | Bhat et al. | |
| 2020/0192148 A1 | 6/2020 | Kim et al. | |
| 2020/0195764 A1 | 6/2020 | Xu et al. | |
| 2021/0029363 A1 | 1/2021 | Senzaki et al. | |
| 2021/0351236 A1 | 11/2021 | Shin et al. | |
| 2022/0181407 A1 | 6/2022 | Jing et al. | |
| 2023/0009765 A1 | 1/2023 | Chung et al. | |

FOREIGN PATENT DOCUMENTS

| | | | |
|---|---|---|---|
| KR | 10-2010-0088680 A | 8/2010 | |
| KR | 10-2012-0071963 A | 7/2012 | |
| KR | 10-1462351 B1 | 11/2014 | |
| KR | 10-2018-0136386 A | 12/2018 | |
| KR | 10-2019-0139062 A | 12/2019 | |
| KR | 10-2020-0014408 A | 2/2020 | |
| KR | 10-2021-0102010 A | 8/2021 | |
| KR | 10-2021-0137856 A | 11/2021 | |
| WO | 2015/116217 A1 | 8/2015 | |
| WO | 2019/213839 A1 | 11/2019 | |
| WO | 2020/192338 A1 | 1/2020 | |
| WO | 2021/036787 A1 | 4/2021 | |

OTHER PUBLICATIONS

Extended European Search Report dated Aug. 26, 2024, issued by the European Patent Office in European Application No. 22788386.5.

Communication dated Jan. 15, 2026, issued by the Korean Ministry of Intellectual Property in Korean Application No. 10-2021-0047313.

* cited by examiner 16.66ms 611
613
610

16.66ms 611    613
610

16.66ms

710

711

713

33.3ms

710

711

715

ELECTRONIC DEVICE COMPRISING CAMERA, AND OPERATING METHOD FOR ELECTRONIC DEVICE

CROSS-REFERENCE TO RELATED APPLICATIONS

This application is a bypass continuation application of International Application No. PCT/KR2022/005253, filed on Apr. 12, 2022, which is based on and claims the benefit of a Korean Patent Application No. 10-2021-0047313, filed on Apr. 12, 2021, in the Korean Intellectual Property Office, the disclosures of each of which are incorporated by reference herein in their entireties.

BACKGROUND

1. Field

The disclosure relates to an electronic device including a camera, and a method for operating the electronic device.

2. Description of Related Art

Recently, electronic devices have been developed for user convenience, and various services or functions are provided.

An electronic device may be implemented to have a hole bored through the upper end of a display such that a front camera is provided in a hole display type, or to have a camera sensor disposed on the left or right side in a notch display type.

Electronic devices have recently been implemented to expand the display screen by utilizing exposed areas of the display to the maximum extent, while reducing the display bezel, in order to effectively display content and information related to execution of various services or functions and to enhance immersive experiences of users. To this end, electronic devices may be implemented to include an under display camera (UDC) such that a front camera is mounted under the display panel, instead of the notch or hole display type. The corresponding portion of the display may be deactivated only when the UDC is activated such that light is transmitted to the camera lens.

Related art electronic devices have a UDC disposed under a display panel that can operate, and pixels, wires, and the like, have regular structures due to the display characteristics, thereby having the influence of light scattering or the like, and interference may be caused by light occurring in the display panel when capturing an image through the UDC. Accordingly, the quality of images captured through the UDC of conventional electronic devices may be degraded.

SUMMARY

Disclosed is an electronic device including a camera such that images are captured through a UDC without interference of light occurring in a display panel, and a method for operating the electronic device.

According to an aspect of the disclosure, there is provided an electronic device including: a display; a camera provided on a rear surface of the display that is not exposed to the outside; at least one memory configured to store instructions; and at least one processor electrically connected to the display, the camera, and the at least one memory, wherein the at least one processor is configured to execute the instructions to: based on receiving a request to photograph an image using the camera in a state in which the display is driven, set a priority of the display and the camera; identify a shutter speed included in camera driving information set in the camera and an off-duty time in a duty cycle set in the display; based on the priority of the camera being set higher than the priority of the display and the shutter speed being identified to be longer than the off-duty time, adjust at least one of display driving information of the display or the camera driving information of the camera; and control the camera to photograph an image within an off-duty time that has changed based on the adjusted at least one of the display driving information or the camera driving information.

The at least one processor may be further configured to execute the instructions to: determine the priority based on at least one of information related to an image displayed on the display, user preference information, user gaze tracking information, or user present condition information; and based on the priority of the display being set higher than the priority of the camera, control the camera to photograph an image within an off-duty time set in the display without adjusting at least one of the display driving information of the display or the camera driving information of the camera, wherein the camera driving information may include at least one of the shutter speed, sensor gain, ISO sensitivity, or an aperture value, which are set in the camera, and wherein the display driving information may include at least one of a refresh rate, duty cycle information, or brightness information, which are set in the display.

The at least one processor may be further configured to execute the instructions to change at least one of an on-duty time in the duty cycle or, based on the shutter speed being longer than the off-duty time, the camera driving information, and wherein the at least one processor may be further configured to execute the instructions to, based on the change in the on-duty time in the duty cycle or a change in at least one of the shutter speed, sensor gain, ISO sensitivity, or an aperture value included in the camera driving information, change the off-duty time to increase the off-duty time.

The at least one processor may be further configured to execute the instructions to: based on the identified shutter speed being longer than the off-duty time, change an on-duty time in a duty cycle of adjacent pixels of the display on which the camera is provided; and maintain display driving information of pixels other than the adjacent pixels, wherein the on-duty time of the adjacent pixels may be reduced based on the shutter speed.

The at least one processor may be further configured to execute the instructions to: based on the shutter speed being longer than the off-duty time, change at least one of a refresh rate, brightness, or a duty cycle included in the display driving information to a low value, based on the shutter speed; and change an on-duty time in a duty cycle of adjacent pixels of the display on which the camera is provided by reducing the on-duty time.

The at least one processor may be further configured to execute the instructions to: based on the shutter speed being longer than the off-duty time, set adjacent pixels of the display on which the camera is provided to be off, and change an on-duty time in a duty cycle of the adjacent pixels to the off-duty time; and maintain display drive information of pixels other than the adjacent pixels.

The at least one processor may be further configured to execute the instructions to: adjust the shutter speed to be short based on the shutter speed being longer than the off-duty time; photograph a plurality of images within the off-duty time at the adjusted shutter speed; and synthesize the photographed plurality of images.

According to an aspect of the disclosure, there is provided a method for operating an electronic device including: based on receiving a request to request to photograph an image using a camera provided on a rear surface of a display that is not exposed to the outside, in a state in which the display is driven, setting a priority of the display and the camera; identifying a shutter speed included in camera driving information set in the camera and an off-duty time in a duty cycle set in the display; based on the priority of the camera being set higher than the priority of the display and the shutter speed being identified to be longer than the off-duty time, adjusting at least one of display driving information of the display or the camera driving information of the camera; and controlling the camera to photograph an image within an off-duty time that has changed based on the adjusted at least one of the display driving information and the camera driving information.

The setting the priority may include determining the priority based on at least one of information related to an image displayed on the display, user preference information, user gaze tracking information, or user present condition information, wherein the method may include, based on the priority of the display being set higher than the priority of the camera, controlling the camera to photograph an image within an off-duty time set in the display without adjusting at least one of the display driving information of the display or the camera driving information of the camera, wherein the camera driving information may include at least one of the shutter speed, sensor gain, ISO sensitivity, or an aperture value which are set in the camera, and wherein the display driving information may include at least one of a refresh rate, duty cycle information, or brightness information which are set in the display.

The adjusting of at least one of the display driving information of the display or the camera driving information of the camera may include: changing at least one of an on-duty time in the duty cycle or, based on the shutter speed being longer than the off-duty time, the camera driving information, and based on the change in the on-duty time in the duty cycle or a change in at least one of the shutter speed, sensor gain, ISO sensitivity, or an aperture value included in the camera driving information, changing the off-duty time to increase the off-duty time.

The adjusting of at least one of the display driving information of the display or the camera driving information of the camera may include: based on the identified shutter speed being longer than the off-duty time, changing an on-duty time in a duty cycle of adjacent pixels of the display on which the camera is provided; and maintaining display driving information of pixels other than the adjacent pixels, and wherein the on-duty time of the adjacent pixels may be reduced based on the shutter speed.

The adjusting of at least one of the display driving information of the display or the camera driving information of the camera may include: based on the shutter speed being longer than the off-duty time, changing at least one of a refresh rate, brightness, or a duty cycle included in the display driving information to a low value; and changing an on-duty time in a duty cycle of adjacent pixels of the display on which the camera is provided by reducing the on-duty time.

The adjusting of at least one of the display driving information of the display or the camera driving information of the camera may include: setting adjacent pixels of the display on which the camera is provided to be off; changing an on-duty time in a duty cycle of the adjacent pixels to the off-duty time; and maintaining display drive information of pixels other than the adjacent pixels.

The method may further include adjusting the shutter speed to be short based on the priority of the camera being higher than the priority of the display and the shutter speed being longer than the off-duty time; controlling to photograph a plurality of images within the off-duty time at the adjusted shutter speed; and synthesizing the photographed plurality of images.

According to an aspect of the disclosure, there is provided a non-transitory storage medium storing a program including executable instructions that, when executed by a processor, cause at least one processor to execute a method including: based on receiving a request to request to photograph an image using a camera provided on a rear surface of a display that is not exposed to the outside, in a state in which the display is driven, setting a priority of the display and the camera; identifying a shutter speed included in camera driving information set in the camera and an off-duty time in a duty cycle set in the display; based on the priority of the camera being set higher than the priority of the display and the shutter speed being identified to be longer than the off-duty time, adjusting at least one of display driving information of the display or the camera driving information of the camera; and controlling the camera to photograph an image within an off-duty time that has changed based on the adjusted at least one of the display driving information and the camera driving information.

According to an aspect of the disclosure, there is provided an electronic device including: at least one memory configured to store instructions; and at least one processor configured to execute the instructions to: based on receiving a request to photograph an image using the camera in a state in which the display is driven, set a priority of the display and the camera; identify a shutter speed included in camera driving information set in the camera and an off-duty time in a duty cycle set in the display; based on the priority of the camera being set higher than the priority of the display and the shutter speed being identified to be longer than the off-duty time, adjust at least one of display driving information of the display or the camera driving information of the camera; and control the camera to photograph an image within an off-duty time that has changed based on the adjusted at least one of the display driving information or the camera driving information.

The at least one processor may be further configured to execute the instructions to: determine the priority based on at least one of information related to an image displayed on the display, user preference information, user gaze tracking information, or user present condition information; and based on the priority of the display being set higher than the priority of the camera, control the camera to photograph an image within an off-duty time set in the display without adjusting at least one of the display driving information of the display or the camera driving information of the camera, wherein the camera driving information may include at least one of the shutter speed, sensor gain, ISO sensitivity, or an aperture value, which are set in the camera, and wherein the display driving information may include at least one of a refresh rate, duty cycle information, or brightness information, which are set in the display.

The at least one processor may be further configured to execute the instructions to change at least one of an on-duty time in the duty cycle or, based on the shutter speed being longer than the off-duty time, the camera driving information, and wherein the at least one processor may be further configured to execute the instructions to, based on the change in the on-duty time in the duty cycle or a change in at least one of the shutter speed, sensor gain, ISO sensitivity, or an aperture value included in the camera driving information, change the off-duty time to increase the off-duty time.

The at least one processor may be further configured to execute the instructions to: based on the identified shutter speed being longer than the off-duty time, change an on-duty time in a duty cycle of adjacent pixels of the display on which the camera is provided; and maintain display driving information of pixels other than the adjacent pixels, wherein the on-duty time of the adjacent pixels may be reduced based on the shutter speed.

The at least one processor may be further configured to execute the instructions to: based on the shutter speed being longer than the off-duty time, change at least one of a refresh rate, brightness, or a duty cycle included in the display driving information to a low value, based on the shutter speed; and change an on-duty time in a duty cycle of adjacent pixels of the display on which the camera is provided by reducing the on-duty time.

One or more embodiments of the disclosure may provide an electronic device including a camera and a method for operating the electronic device, wherein the electronic device maintains an optimal image quality such that images are captured through a UDC without interference of light occurring in a display panel, thereby improving the quality of images captured through the UDC, and light interference of effective pixels of the display panel is removed such that the entire visible display area can be used with no sense of difference. Various other advantageous effects identified explicitly or implicitly through the disclosure may be provided.

BRIEF DESCRIPTION OF THE DRAWINGS

The above and other aspects, features, and advantages of embodiments of the disclosure will be more apparent from the following description taken in conjunction with the accompanying drawings, in which.

In connection with the description of the drawings, the same or similar reference numerals may be used for the same or similar elements.

DETAILED DESCRIPTION

Hereinafter, an electronic device according to various embodiments will be described with reference to the accompanying drawings. The term "user" used in various embodiments may refer to a person using an electronic device or a device using an electronic device (e.g., an artificial intelligence electronic device).

Figure 1:
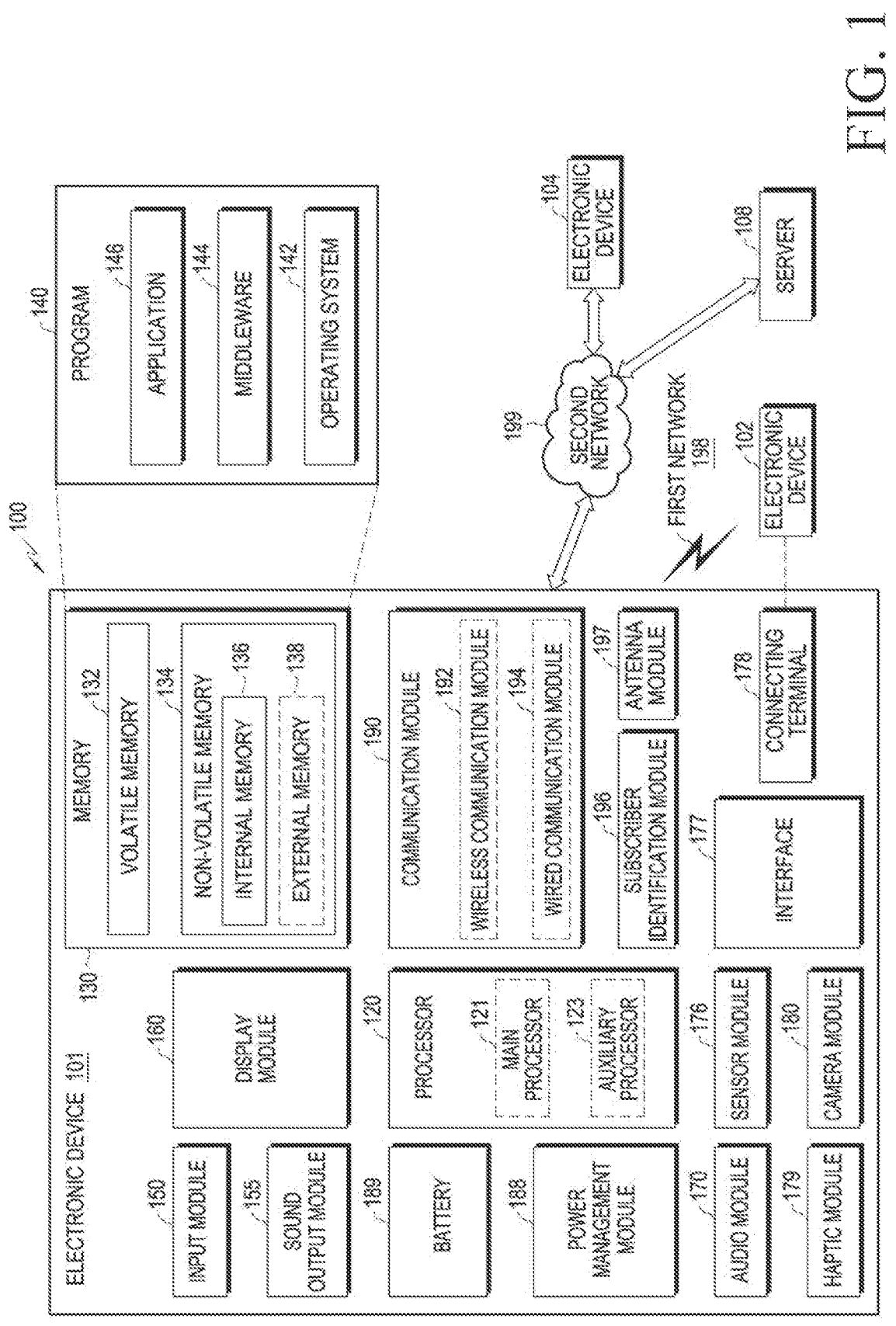
FIG. 1 is a block diagram of an electronic device in a network environment, according to one or more embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
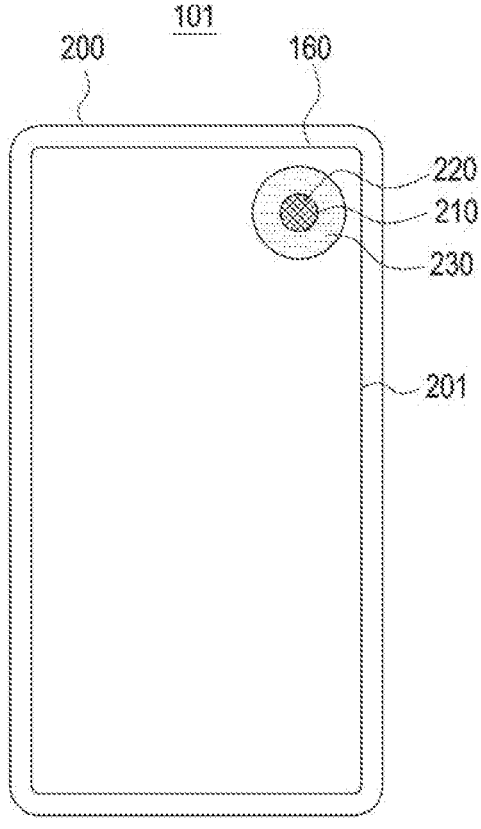
FIG. 2 illustrates an electronic device, according to an embodiment.
Figure 3:
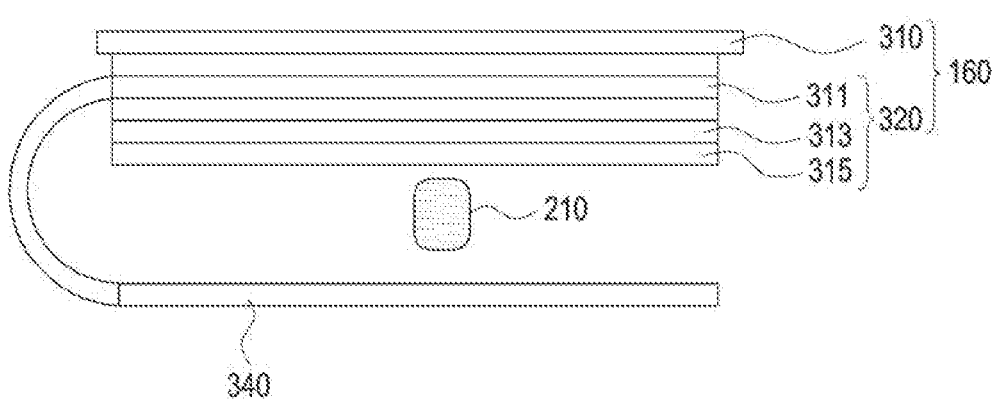
FIG. 3 illustrates a display module of an electronic device, according to an embodiment.
Figure 4:
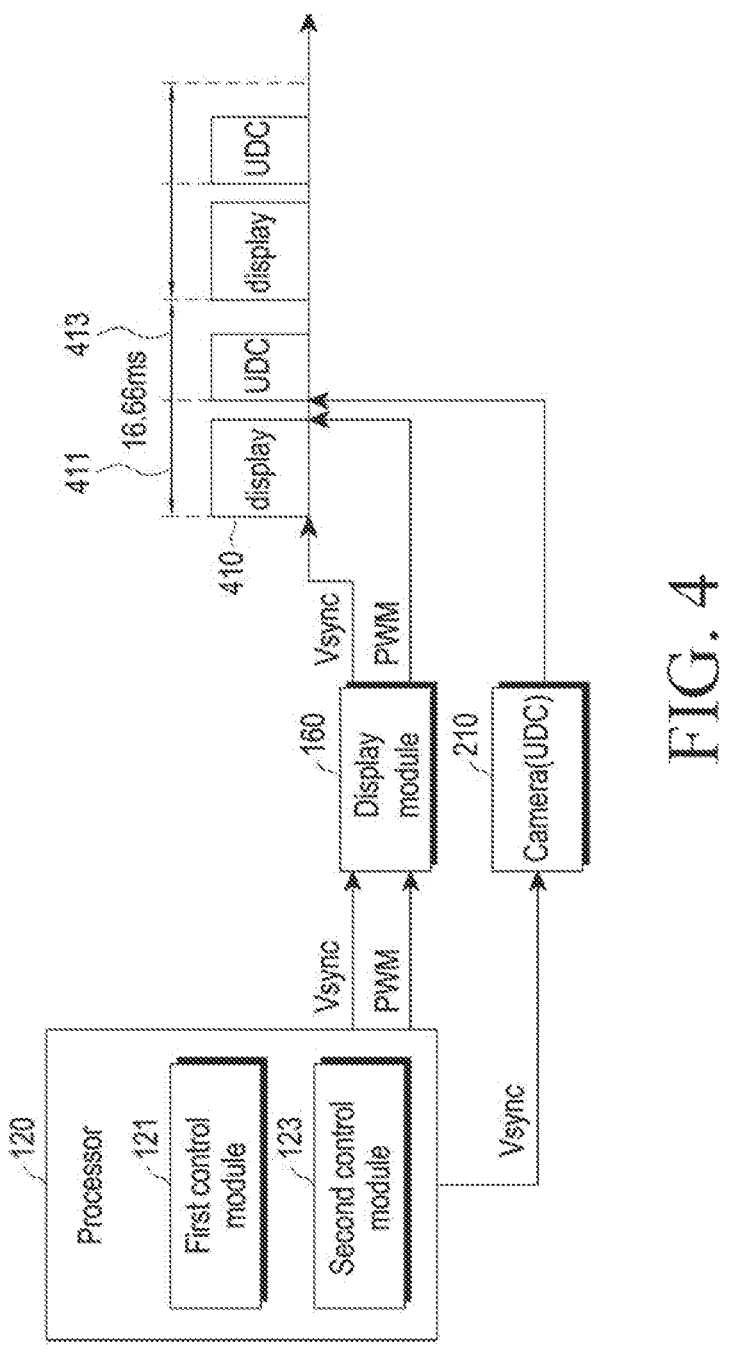
FIG. 4 illustrates an electronic device, according to an embodiment.

FIG. 2 illustrates an electronic device according to an embodiment, FIG. 3 illustrates a display module of the electronic device according to an embodiment, and FIG. 4 illustrates an electronic device according to an embodiment.

Referring to FIGS. 1 and 2, an electronic device 101 (e.g., the electronic device 101 in FIG. 1) according to an embodiment may include a display module 160 (e.g., the display module 160 in FIG. 1) disposed on a front surface 201 of a housing 200 and a camera 210 (e.g., the camera module 180 in FIG. 1). The electronic device 101 according to an embodiment may include a memory 130 and at least one processor 120 electrically connected to the display module 160, the camera 210, and the memory 130. In addition to this, the electronic device 101 according to an embodiment may further include other components described in FIG. 1.

Referring to FIGS. 1, 2, 3, and 4, according to an embodiment, the display module 160 (e.g., display) may be disposed to be exposed through the front surface 201 of the housing 200, and include a window 310 disposed such that a first surface thereof is exposed, and a display panel 320 disposed on a second surface (a rear surface) of the window 310 (e.g., a transparent glass layer). The display panel 320 may include a board (e.g., a flexible circuit board (FPCB)) 340 and a display element layer 311 disposed on the board 340. The display panel 320 may include a touch sensitive panel (TSP). The display element layer 311 may include a circuit layer including a thin film transistor (TFT), an organic light emitting diode (OLED) as a display element, and an encapsulation layer disposed therebetween. According to an embodiment, the display module 160 may include a display driver integrated circuit (DDI). According to an embodiment, the window 310 and the display panel 320 may be at least partially curved. The display panel 320 may be formed of a flexible polymer film, and may include, for example, polyimide, polyethylene terephthalate, or other polymer materials. The display panel 320 may include a first polymer layer 313 (e.g., polyimide) and a second polymer layer 315 (e.g., polyethylene terephthalate) disposed under the display element layer 311. Without being limited thereto, and the positions and shapes of components included in the display module 160 may be changed, and other components may be further added.

According to an embodiment, the camera 210 may be disposed on a rear surface (e.g., a second surface) of the display module 160 that is not exposed to the outside. As shown in FIG. 3, the camera 210 may be an under display camera (e.g., an under display camera (UDC) camera) 210 in which at least a part of the camera module 180 is disposed under disposed under the display panel 320. According to an embodiment, the camera 210 may be disposed between the display panel 320 and the board 340. According to an embodiment, the camera 210 may be at least a part of the camera module 180 in FIG. 1 and may be included inside the housing 200 so as not to be exposed. The camera 210 may include at least one of a camera sensor (e.g., an image sensor) configured to acquire an image by detecting light incident through the window 310 through a lens and converting the light into a digital signal, an image processing module configured to process an image, or a memory 130 configured to store an image.

According to an embodiment, the processor 120 may simultaneously/sequentially provide synchronization signals (Vsync) to the display module 160 and the camera 210 to synchronize the display module 160 and the camera 210 in order to enable the display module 160 and the camera 210 to interwork with each other when the camera 210 is driven while the display module 160 is driven. The processor 120 may avoid interference by light emitted from the display module 160 by adjusting at least one of camera driving information and display driving information by interworking between the display module 160 and the camera 210, and remove light interference caused by light leaking from the inside of the display module 160 entering the lens of the camera 210 to optimize photographing conditions necessary for photographing an image such that image quality is optimally maintained. According to an embodiment, the processor 120 may include a first control module 121 (e.g., the main processor 121 in FIG. 1) configured to perform control such that synchronization signals are simultaneously/sequentially provided to the display module 160 and the camera 210, in order to enable the display module 160 and the camera 210 to interwork with each other. The processor 120 may analyze the content or image displayed on the display module 160 to identify whether the image is an image according to the driving of the camera 210, and identify one of the driving of the display or the driving of the camera which is to be determined as priority. To this end, the processor 120 may include a second control module 123 (e.g., the auxiliary processor 123 in FIG. 1) configured to perform control such that functions for user preference analysis and/or user's gaze tracking are performed.

For example, the camera driving information may include at least one of the shutter speed, sensor gain (or gain), ISO sensitivity, or an aperture value (F) which are set in the camera 210. In addition to these, the camera driving information may also include other parameters related to driving the camera 210. For example, the display driving information may include at least one of a refresh rate (or screen refresh rate), duty cycle information, or brightness information which are set in the display module 160. In addition to these, the display driving information may also include other parameters related to driving the display module 160. The refresh rate may refer to how many times per second a display screen is output, and may be referred to as a screen refresh rate or a screen refresh frequency. The refresh rate may be expressed as a unit of hertz (Hz), and the higher the number of hertz, the higher the screen refresh rate. Information related to the duty cycle may include a set duty cycle and/or duty ratio. The duty cycle may refer to a method of indicating one frame (e.g., in the case of 60 Hz, one frame is indicated by $\frac{1}{60}$ second) by using the number of light emissions into which the one frame is divided (e.g., 2duty: on, off, 4duty: on, off, on, off). The duty ratio may refer to a ratio of an on-duty time (or light emission time) for displaying a screen and an off-duty time (non-light emission time). The brightness information may include information indicating the amount of light generated in the surrounding environment. For example, the processor 120 may obtain ambient brightness information from the surrounding environment by using at least one sensor (e.g., the sensor module 176 or the illuminance sensor in FIG. 1). For example, the ambient brightness information may include information related to brightness by light emitted from the display module (e.g., the display module 160 in FIGS. 1, 2, 3, and 4) or information related to brightness by lighting in the surrounding environment.

According to an embodiment, the processor 120 may configure a priority of the display module 160 and the camera 210 to perform an operation for optimizing photographing conditions necessary for photographing an image to optimally maintain image quality of the camera. For example, the processor 120 may determine the priority of the display module 160 and the camera 210, and set priority information including a weight factor for each of the display module 160 and the camera 210 according to the determined priority. For example, the processor 120 may determine the priority, based on at least one of information related to an image displayed on the display module 160, user preference information, user's gaze tracking information, or user's present condition information. For example, the information related to the image displayed on the display module 160 may include information related to another screen displaying content desired by the user (e.g., user's another screen during a video call or a data screen during Internet broadcasting). The user preference information, which is a priority requested by the user, may include information indicating the priority of the display module 160 or the priority of the camera 210. The user's gaze tracking information may include information on a location toward which the user's gaze tracked using a gaze tracking function is directed.

According to an embodiment, the processor 120 may use the duty cycle 410 of the display module 160 when photographing an image by using the camera 210. As shown in FIG. 4, the duty cycle 410 may include an on-duty 411 and an off-duty 413 of each pixel of the display panel 320 which regularly occur according to display driving information (e.g., a fresh rate and a duty ratio). The on-duty 411 in the duty cycle 410 may be a light emission period during which light is emitted by the display module 160. When an image is photographed in the on-duty 411, light emitted from the display module 160 may be received by a camera sensor and cause light interference, and therefore, the quality of the captured image may be degraded thereby. The off-duty 413 of the duty cycle 410 may be a non-emission period during which no light is generated by the display module 160. The processor 120 may control the camera 210 such that an image is photographed within the off-duty 413 time of the pixels, and may adjust variable elements (e.g., camera driving information and/or display driving information) suitable for situations or environments. According to an embodiment, the processor 120 may identify a start time (on time) of the on-duty 411, based on the synchronization signal (Vsync) provided to the display module 160, and control the display module 160 such that light is generated within the on-duty 411. The processor 120 may identify an end time of the on-duty 411, based on a pulse width modulation (PWM) signal. The processor 120 may identify a start time of the off-duty 413 at the same time or after a predetermined time as or from the end time (off time) of the on-duty 411, based on the synchronization signal (Vsync) provided to the camera 210. The processor 120 may drive the camera 210 at the start time (on time) of the off-duty 413 and control the display module 160 such that light is not generated.

According to an embodiment, the processor 120 may identify camera driving information set in the camera 210 and display driving information set in the display module 160. The processor 120 may identify a shutter speed included in the camera driving information and an off-duty time of a duty cycle included in the display driving information. For example, the processor 120 may identify the shutter speed set in the camera 210 as $1/60$ (16.66 ms) and the refresh rate included in the display driving information as 120 Hz.

According to an embodiment, the processor 120 may identify priority of the display 160 and the camera 210, based on priority information set for the display 160 and the camera 210, respectively. When the processor 120 identifies that the priority of the camera 210 is set to be high, the processor 120 may compare the identified shutter speed with the identified off-duty time to determine whether to adjust the display driving information and/or the camera driving information. When the priority of the camera 210 is higher than the priority of the display module 160 and the identified shutter speed is longer than the identified off-duty time, the processor 120 may adjust the display driving information and/or the camera driving information. When the priority of the display module 160 is high, the processor 120 may control the camera 210 such that an image is photographed based on the identified display driving information and/or the camera driving information, without adjusting the display driving information and/or the camera driving information. When the priority of the camera 210 is higher while the identified shutter speed is shorter than the identified off-duty time, the processor 120 may control the camera 210 such that an image is photographed based on the identified display driving information and/or the camera driving information without adjusting the display driving information and/or the camera driving information.

According to one embodiment, when the priority of the camera 210 is higher and the identified shutter speed is longer than the identified off-duty time, as shown in FIG. 4, the processor 120 may adjust the on-duty 411 time and/or the off-duty 413 time such that the on-duty 411 time and the off-duty 413 time are regularly generated in the duty cycle 410 of the display module 160 without overlapping each other. The processor 120 may change at least one (e.g., a shutter speed, sensor gain, ISO sensitivity, or an aperture value) of the on-duty 411 time or the camera driving information, based on the set duty cycle 410 and shutter speed (e.g., $1/60$ (16.66 ms)). For example, the processor 120 may maintain the on-duty 411 and off-duty 413 time (60 Hz (16.66 ms)) as a time of a half cycle of the duty cycle 410 by the refresh rate (e.g., 120 Hz), adjust the on-duty 411 time to be shortened within the time (e.g., 16.66 ms) of the half cycle of the duty cycle 410, and adjust the off-duty 413 time to be lengthened in response to the adjustment of the on-duty 411 time. For example, since the off-duty 413 time adjusted based on the shutter speed (e.g., 16.66 ms) is short, the processor 120 may further adjust the shutter speed to a value lower than the identified $1/60$ (16.66 ms) in response to the off-duty 413 having been adjusted to have an increased time.

According to an embodiment, when the priority of the camera 210 is higher and the identified shutter speed (e.g., 16.66 ms) is longer than the identified off-duty time (e.g., 8.35 ms), the processor 120 may change the refresh rate (e.g., 120 Hz) or brightness included in the display driving information to a low value, based on the set shutter speed. For example, when the set refresh rate is 120 Hz and the duty ratio is 50%, the processor 120 may identify that the off-duty 413 time, which is 4.17 ms, is shorter than the identified shutter speed (e.g., 16.66 ms). The processor 120 may change the refresh rate to, for example, 30 Hz so that the off-duty 413 time is longer than the identified shutter speed (e.g., 16.66 ms). For example, when the screen fresh rate is changed to as low as 30 Hz, the time of a half cycle of the duty cycle 410 (e.g., the time of the half cycle when the duty ratio is 50%) may be increased to 33.3 ms, and the off-duty 413 time (off time) may be increased to 16.7 ms.

According to an embodiment, when the priority of the camera 210 is higher and the identified shutter speed (e.g., 16.66 ms) is longer than the identified off-duty time (e.g., 8.35 ms), the processor 120 may identify adjacent pixels of the display module 160 in the region 230 adjacent to the region 220 where the camera 210 is disposed, and change the on-duty time in the duty cycle of the identified adjacent pixels. The processor 120 may maintain display driving information of pixels other than the adjacent pixels. For example, when the identified shutter speed is longer than the identified off-duty time, the processor 120 may change only the on-duty time set in the adjacent pixels to be optimized (e.g., reduced), based on the identified shutter speed (e.g., 16.66 ms), such that the identified shutter speed is included in the time range of the duty cycle (e.g., 33.3 ms). As another example, when the identified shutter speed (e.g., 16.66 ms) is longer than the identified off-duty time (e.g., 8.35 ms), the processor 120 may change the refresh rate to, for example, 30 Hz, and change only the on-duty time set in the adjacent pixels to be optimized (e.g., reduced) based on the identified shutter speed (e.g., 16.66 ms). When the off-duty time corresponding to the shutter speed is secured by simply reducing the on-duty time of the identified refresh rate, the identified refresh rate may be maintained without being changed.

According to an embodiment, when the priority of the camera 210 is higher and the identified shutter speed is longer than the identified off-duty time, the processor 120 may change the on-duty time of the duty cycle of adjacent pixels to the off-duty time by configuring the adjacent pixels of the display module 160 having the camera 210 disposed thereon, to be off, and maintain display driving information of pixels other than the adjacent pixels. For example, according to the on-duty time in the duty cycle of the adjacent pixels which has been changed to the off-duty time, the processor 120 may perform adjustment such that the off-duty time corresponds to the time of a half cycle of the duty cycle (e.g., 33.3 ms), based on the identified shutter speed. As another example, according to the on-duty time in the duty cycle of the adjacent pixels which has been changed to the off-duty time, the processor 120 may adjust the off-duty time such that the off-duty time is longer than the identified shutter speed and included within the time range (e.g., 33.3 ms) of a half cycle of the duty cycle.

According to an embodiment, when it is difficult to secure the set shutter speed of the camera 210 as much as possible within the duty cycle while the priority of the camera 210 is high, the processor 120 may shorten the identified shutter speed, photograph a plurality of images within the identified off-duty time at the adjusted shutter speed, and synthesize the plurality of photographed images. According to an embodiment, the quality of the image photographed by the camera 210 may be optimized by synthesizing the plurality of photographed images.

Referring to FIGS. 1, 2, and 4, the memory 130 of the electronic device 101 according to an embodiment may store instructions for causing operations executed by a processor to be performed. At least one processor 120 may execute instructions stored in the memory 130.

In an embodiment, the main components of the electronic device have been described through the electronic device 101 in FIGS. 1, 2, and 4. However, in various embodiments, not all components shown in FIGS. 1, 2, and 4 are essential components, and the electronic device 101 may be implemented with more components than the illustrated components and be implemented with fewer components than the illustrated components. In addition, the locations of the main components of the electronic device 101 described above with reference to FIGS. 1, 2, and 4, may be changeable according to various embodiments.

According to an embodiment, an electronic device (e.g., the electronic device 101 in FIGS. 1, 2, and 4 (hereinafter referred to as the first electronic device 101)) may include a display module (e.g., the display module 160 in FIGS. 1, 2, 3, and 4), a camera (e.g., the camera module 180 in FIG. 1 and the camera 210 in FIGS. 2, 3, and 4) disposed on the rear surface of the display module that is not exposed to the outside, a memory (e.g., the memory 130 in FIG. 1), and at least one processor (e.g., the processor 120 in FIGS. 1 and 4) electrically connected to the display module, the camera, and the memory, wherein the at least one process may be configured to configure priority of the display module and priority of the camera in response to a request to photograph an image using the camera in a state in which the display module is driven, identify a shutter speed included in camera driving information set in the camera and an off-duty time in a duty cycle set in the display module, adjust at least one of display driving information of the display module or the camera driving information of the camera, based on the priority of the camera being set higher than the priority of the display module and the shutter speed being identified to be longer than the off-duty time, and control the camera such that an image is photographed within an off-duty time that has changed based on the adjustment of at least one of the display driving information or the camera driving information.

According to an embodiment, the processor may be configured to determine the priority, based on at least one of information related to an image displayed on the display module, user preference information, user's gaze tracking information, or user's present condition information. The camera driving information may include at least one of the shutter speed, sensor gain, ISO sensitivity, or an aperture value which are set in the camera. The display driving information may include at least one of a refresh rate, duty cycle information, or brightness information which are set in the display module.

According to an embodiment, the at least one processor may be configured to control the camera to photograph an image within an off-duty time set in the display module without adjusting at least one of display driving information of the display module or the camera driving information of the camera, based on the priority of the display being set higher than the priority of the camera.

According to an embodiment, the at least one processor may be configured to, based on the set duty cycle and the shutter speed, change at least one of an on-duty time in the duty cycle or the camera driving information when the shutter speed is longer than the off-duty time.

According to an embodiment, the at least one processor may be configured to change the off-duty time such that the off-duty time is increased in response to a change in the on-duty time or a change in at least one of the shutter speed, sensor gain, ISO sensitivity, or an aperture value included in the camera driving information.

According to an embodiment, the at least one processor may be configured to, based on the shutter speed, change at least one of a refresh rate, brightness, or a duty cycle included in the display driving information to a low value when the shutter speed is longer than the off-duty time.

According to an embodiment, the at least one processor may be configured to change an on-duty time in a duty cycle of adjacent pixels of the display module having the camera disposed thereon when the identified shutter speed is longer than the off-duty time, and maintain display driving information of pixels other than the adjacent pixels, wherein the on-duty time of the adjacent pixels may be changed to be optimized (e.g., reduced), based on the shutter.

According to an embodiment, the at least one processor may be configured to change, when the shutter speed is longer than the off-duty time, at least one of a refresh rate, brightness, or duty cycle included in the display driving information to a low value, based on the shutter speed, and change an on-duty time in the duty cycle of the adjacent pixels of the display module having the camera disposed thereon such that the on-duty time is optimized (e.g., reduced).

According to an embodiment, the at least one processor may be configured to, when the shutter speed is longer than the off-duty time, set adjacent pixels of the display module having the camera disposed thereon, to be off, and change an on-duty time in a duty cycle of the adjacent pixels to an off-duty time, and maintain display drive information of pixels other than the adjacent pixels.

According to an embodiment, the at least one processor may be configured to adjust the shutter speed to be short when the shutter speed is longer than the off-duty time, photograph a plurality of images within the off-duty time at the adjusted shutter speed, and synthesize the plurality of photographed images.

Hereinafter, a method for operating an electronic device will be described based on the electronic device according to an embodiment described with reference to FIGS. 1, 2, 3, and 4.

Figure 5:
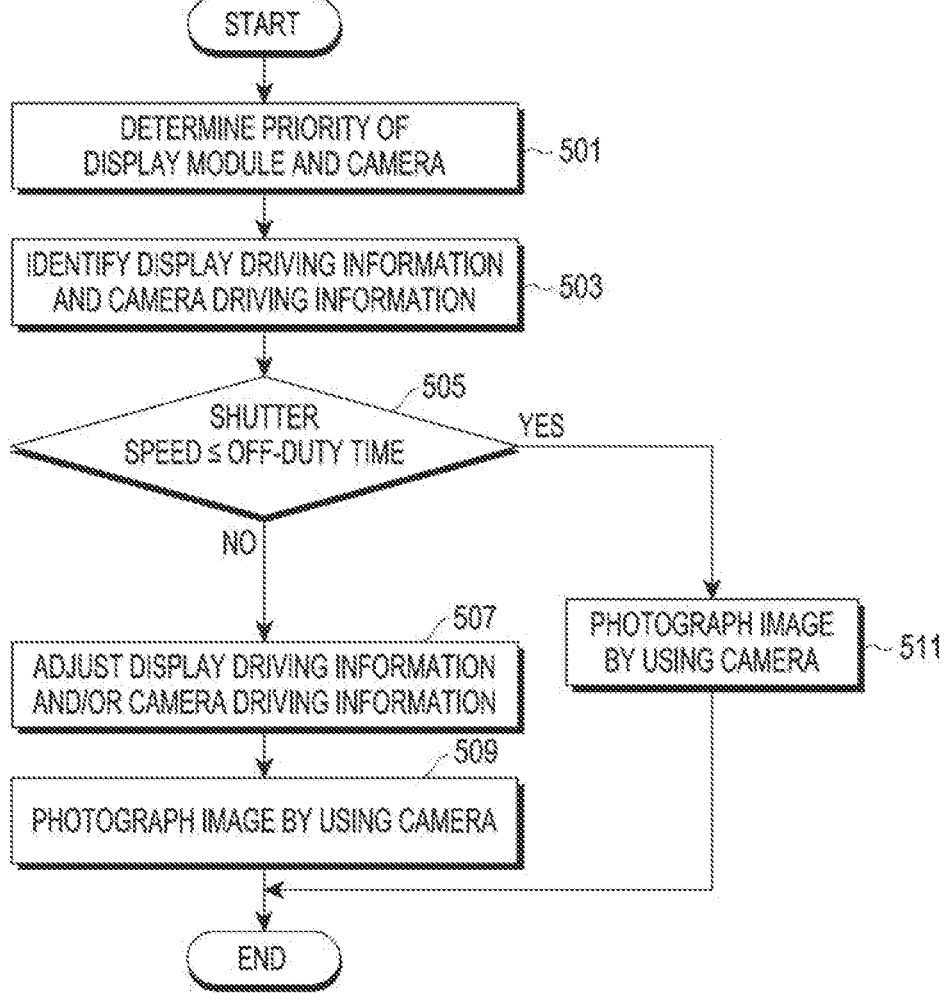
FIG. 5 illustrates an example of a method for operating an electronic device, according to an embodiment.

FIG. 5 illustrates an example of a method for operating an electronic device according to an embodiment.

An electronic device (e.g., the electronic device 101 in FIGS. 1 and 2) according to an embodiment may simultaneously/sequentially provide synchronization signals to the display module and the camera to synchronize the display module and the camera in order to enable the display module and the camera to interwork with each other when the camera (e.g., the camera module 180 in FIG. 1, the camera 210 in FIGS. 2, 3, and 4) is driven while the display module (e.g., the display module 160 in FIGS. 1, 2, 3, and 4) is driven. The electronic device may avoid interference by light emitted from the display module by adjusting at least one of camera driving information and display driving information by interworking between the display module and the camera, and remove light interference caused by light leaking from the inside of the display module 160 entering the lens of the camera 210 to optimize photographing conditions necessary for photographing an image such that image quality is optimally maintained.

Referring to FIG. 5, in operation 501, an electronic device according to an embodiment may determine priority of the display module and priority of the camera in response to a request to photograph an image using a camera while a display module is driven. For example, the electronic device may set priority information including a weight factor for each of the display module and the camera according to the determined priority. For example, the electronic device may determine the priority, based on at least one of information related to an image displayed on the display module, user preference information, user's gaze tracking information, or user's present condition information. For example, the information related to the image displayed on the display module may include information related to another screen displaying content desired by a user (e.g., user's another screen during a video call or a data screen during Internet broadcasting). The user preference information, which is a priority requested by the user, may include information indicating the priority of the display module 160 or the priority of the camera 210. The user's gaze tracking information may include information on a location toward which the user's gaze tracked using a gaze tracking function is directed.

In operation 503, the electronic device may identify camera driving information set in the camera and display driving information set in the display module. In order to avoid interference by light emitted from the display module when an image is photographed by the camera, the electronic device may be configured such that an image is photographed at a shutter speed set to be within an off-duty time in a duty cycle by using the duty cycle of the display. To this end, the electronic device may identify a shutter speed included in the camera driving information and an off-duty time in the duty cycle set in the display module. For example, the camera driving information may include at least one of the shutter speed, a sensor gain value, an ISO sensitivity value, and an aperture value (F) which are set in the camera. In addition to these, the camera driving information may also include other parameters related to driving the camera 210. For example, the display driving information may include at least one of a refresh rate (or screen refresh rate), duty cycle information, or brightness information which are set in the display module 160. In addition to these, the display driving information may also include other parameters related to driving the display module 160.

In operation 505, the electronic device may identify the priority of the display and the camera, respectively, based on the priority information set for the display and the camera, and identify whether the shutter speed is longer than the off-duty time by comparing the shutter speed with the off-duty time. When the identified result indicates that the shutter speed is longer than the off-duty time, the electronic device may perform operation 507. When the shutter speed is shorter than or equal to the off-duty time, the electronic device may perform operation 511.

In operation 507, based on the identified priority of the camera being set higher than the priority of the display module and the identified shutter speed being longer than the off-duty time (operation 505—No), the electronic device may adjust at least one of the display driving information of the display module or the camera driving information of the camera.

In an embodiment, when the shutter speed is longer than the off-duty time (operation 505—No), in operation 509, the electronic device may photograph an image by using the camera within the off-duty time changed by the adjustment (operation 507) of at least one of the display driving information and the camera driving information.

In operation 505, when the priority of the camera is identified to be set higher than the priority of the display module and the shutter speed is identified to be equal to or shorter than the off-duty time (operation 505—Yes), in operation 511, the electronic device may photograph an image by using the camera, based on the set display driving information and camera driving information, without adjusting at least one of the display driving information of the display module or the camera driving information of the camera. For example, when the priority of the display is set higher than the priority of the camera, the electronic device may terminate or delay image photographing by the camera or photograph an image at low quality, without adjusting at least one of the display driving information of the display module or the camera driving information of the camera, and may display guidance information related thereto on the display module 160.

Figure 6A:
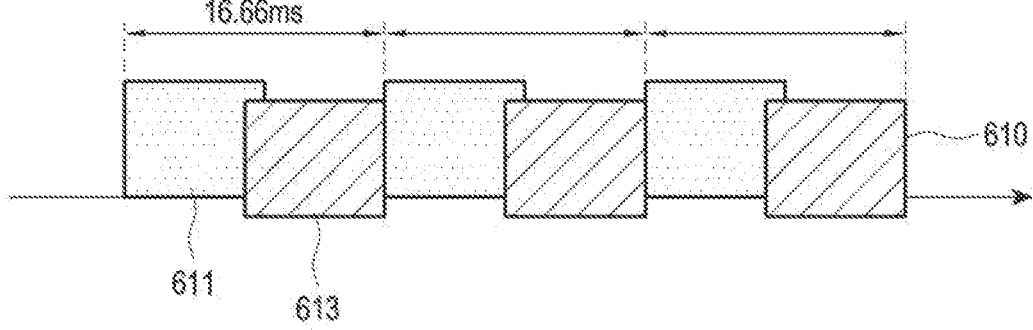
FIGS. 6A and 6B illustrate duty cycles of a display module according to an embodiment.
Figure 6B:
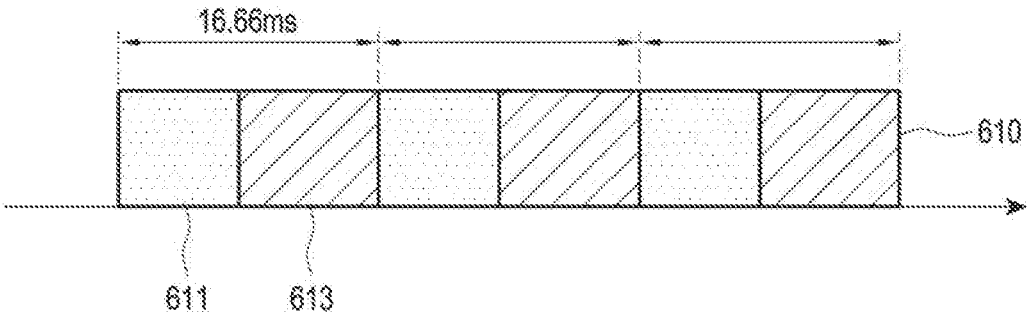

FIGS. 6A and 6B illustrate duty cycles of a display module according to an embodiment.

Referring to FIGS. 6A and 6B, when a camera (e.g., the camera module 180 in FIG. 1, and the camera 210 in FIGS. 2, 3 and 4) is driven while the display module (e.g., the display module 160 in FIGS. 1, 2, 3, and 4) is driven, as in operation 507 in FIG. 5, an electronic device (e.g., the electronic device 101 in FIGS. 1 and 2) according to an embodiment may adjust (or change) driving information of the camera and/or driving information of the display as conditions for photographing an image to maintain optimal image quality. For example, the electronic device may identify a shutter speed included in the identified camera driving information as $\frac{1}{60}$ (16.66 ms), identify a refresh rate included in the display driving information as 120 Hz, and identify a duty cycle 610 and a duty ratio (e.g., 50%). The refresh rate may refer to how many times per second a display screen is output, and may be referred to as a screen refresh rate or a screen refresh frequency. The refresh rate may be expressed as a unit of hertz (Hz), and the higher the number of hertz, the higher the screen refresh rate.

According to an embodiment, when the priority of the camera is identified to be set higher than the priority of the display module and the shutter speed (e.g., $\frac{1}{60}$ (16.66 ms)) is identified longer than the off-duty 613 time (e.g., 8.3 ms)) in the duty cycle 610, as in operation 507 of FIG. 5, the electronic device may adjust at least one of the display driving information of the display module or the camera driving information of the camera. For example, the electronic device may adjust the on-duty 611 time and/or the off-duty 613 time such that the on-duty 611 time and the off-duty 613 time are regularly generated in the duty cycle 610 of the display module 160 without overlapping each other. The electronic device may change at least one (e.g., a shutter speed, sensor gain, ISO sensitivity, or an aperture value) of the on-duty 611 time or the camera driving information, based on the set duty cycle 610 and shutter speed (e.g., 1/60 (16.66 ms)). For example, the electronic device may maintain the on-duty 611 and off-duty 613 time (60 Hz (16.66 ms)) as a time of a half cycle of the duty cycle 610 by a refresh rate (e.g., 120 Hz), adjust the on-duty 611 time to be shortened within the time (e.g., 16.66 ms) of the half cycle of the duty cycle 610, and adjust the off-duty 613 time to be lengthened in response to the adjustment of the on-duty 611 time. For example, since the off-duty 613 time adjusted based on the shutter speed (e.g., 16.66 ms) is short, the electronic device may further adjust the shutter speed to a value lower than the identified 1/60 (16.66 ms) in response to the off-duty 613 having been adjusted to have an increased time.

Figure 7A:
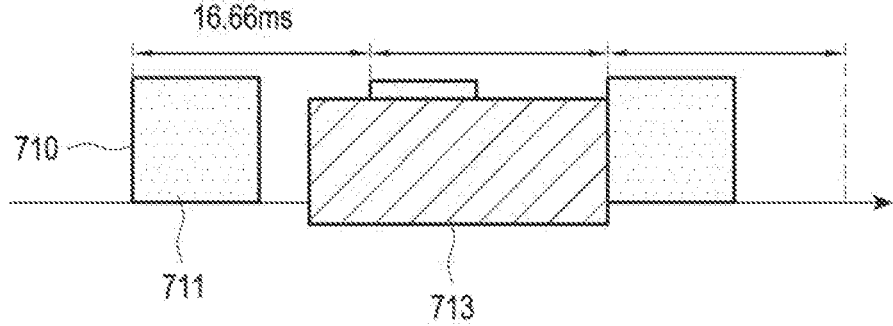
FIGS. 7A and 7B illustrate duty cycles of a display module according to an embodiment.
Figure 7B:
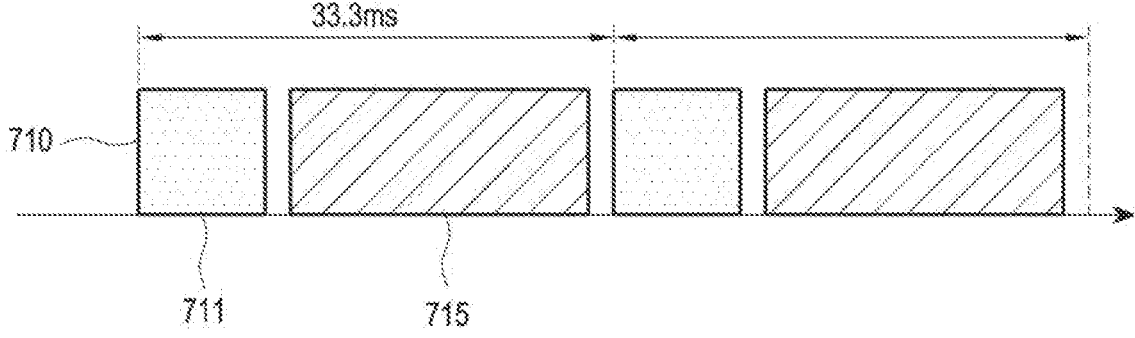

FIGS. 7A and 7B illustrate duty cycles of a display module according to an embodiment.

Referring to FIGS. 7A and 7B, when the priority of the camera is higher than the priority of the display module and the off-duty 713 time corresponding to the identified shutter speed (e.g., 16.66 ms) is longer than the designated off-duty time (e.g., 8.35 ms) within a half cycle (on-duty and off-duty time) (e.g. 16.66 ms) of the duty cycle 710, the electronic device (e.g., the electronic device 101 in FIGS. 1 and 2) according to an embodiment may change the refresh rate (e.g., 120 Hz) or brightness included in the display driving information to a low value, based on the set shutter speed, as in operation 507 in FIG. 5. For example, when the set refresh rate is 120 Hz and the duty ratio is 50%, the electronic device may identify that the remaining time (e.g., 8.35 ms) to be used as an off-duty after the on-duty 711 time (e.g., 8.35 ms) in the duty cycle 710 is shorter than the identified shutter speed (e.g., 16.66 ms). The electronic device may change the refresh rate to, for example, 30 Hz so that the designated off-duty time is longer than the identified shutter speed (e.g., 16.66 ms). For example, when the refresh rate is changed to as low as 30 Hz, the time of a half cycle of the duty cycle 710 (e.g., the time of the half cycle when the duty ratio is 50%) may be increased to 33.3 ms and the changed off-duty 715 time (off time) may be increased to 16.7 ms. The electronic device may maintain the on-duty 711 time in the duty cycle 710 without changing the on-duty 711 time.

Figure 8:
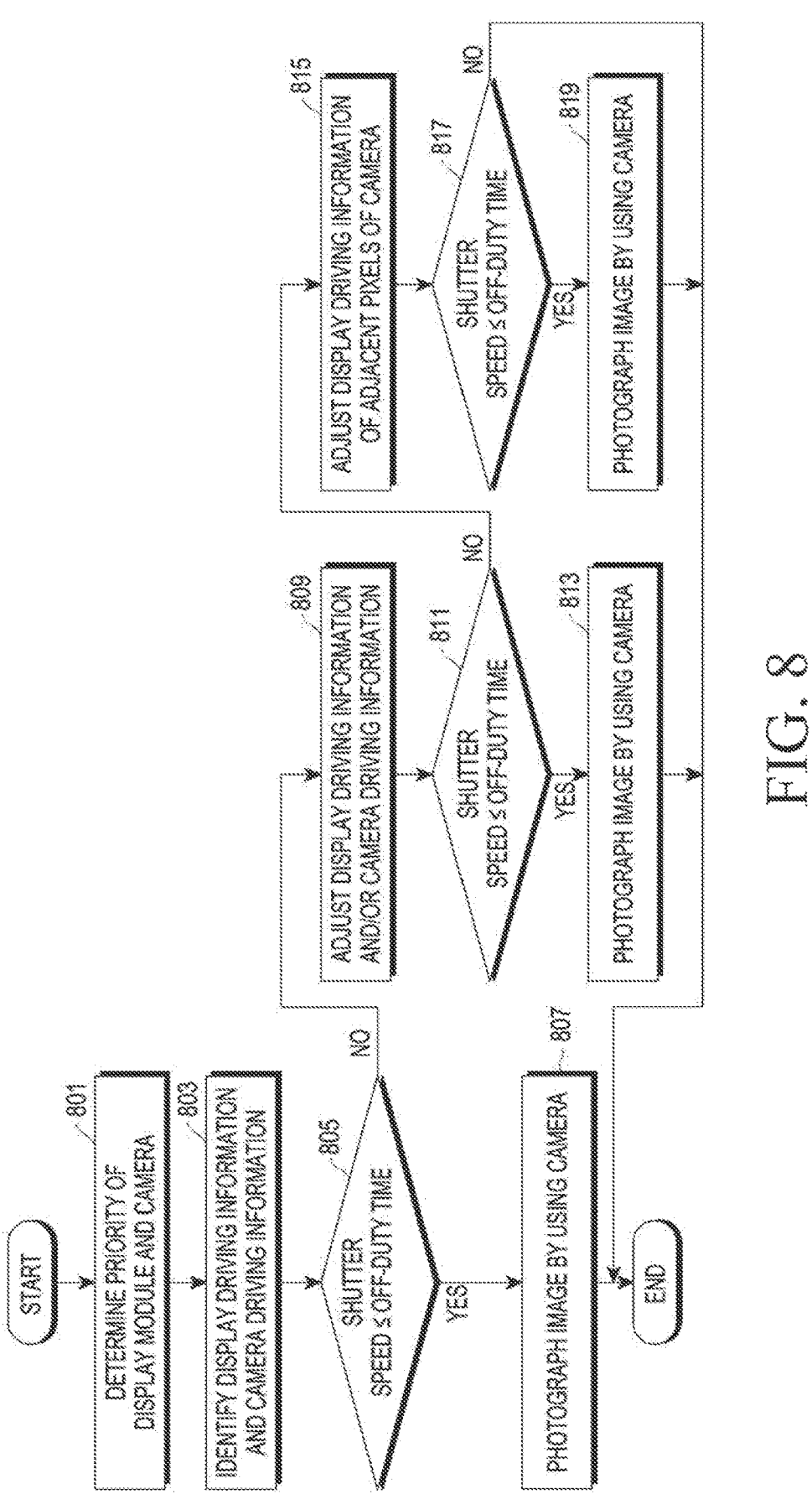
FIG. 8 illustrates an example of a method for operating an electronic device, according to an embodiment.
Figure 9A:
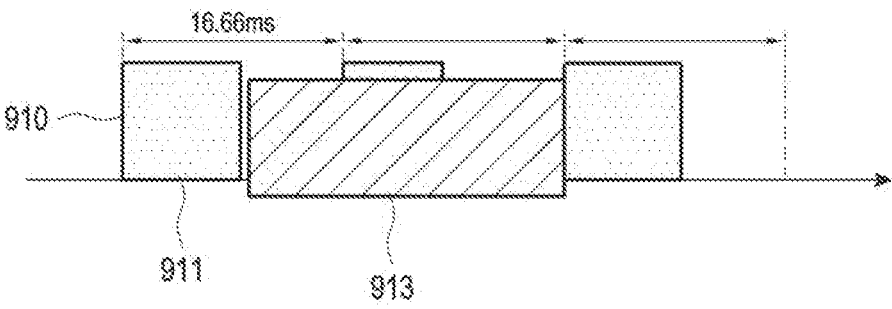
FIGS. 9A, 9B, and 9C illustrate duty cycles of a display module according to an embodiment.
Figure 9B:
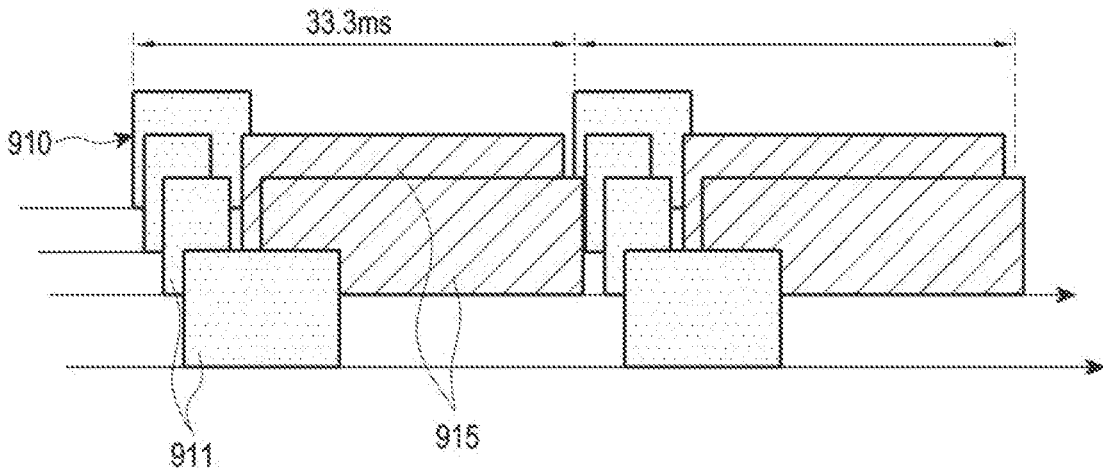
Figure 9C:
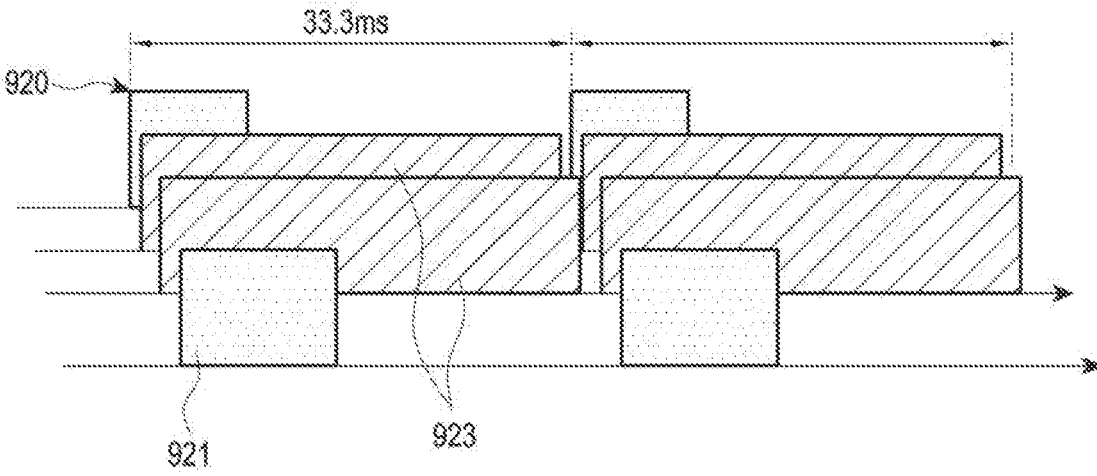

FIG. 8 illustrates an example of a method for operating an electronic device according to an embodiment, and FIGS. 9A, 9B, and 9C illustrate duty cycles of a display module, according to an embodiment.

In operation 801, the electronic device (e.g., the electronic device 101 in FIGS. 1 and 2) according to an embodiment may determine priority of the display module and priority of the camera in response to a request to photograph an image using the camera (e.g., the camera module 180 in FIG. 1, the camera 210 in FIGS. 2, 3, and 4) while the display module (e.g., the display module 160 in FIGS. 1, 2, 3 and 4) is driven. For example, the electronic device may set priority information including a weight factor for each of the display module and the camera according to the determined priority. For example, the electronic device may determine the priority, based on at least one of information related to an image displayed on the display module, user preference information, user's gaze tracking information, or user's present condition information. For example, the information related to the image displayed on the display module may include information related to another screen displaying content desired by a user (e.g., user's another screen during a video call or a data screen during Internet broadcasting). The user preference information, which is a priority requested by the user, may include information indicating the priority of the display module 160 or the priority of the camera 210. The user's gaze tracking information may include information on a location toward which the user's gaze tracked using a gaze tracking function is directed.

In operation 803, the electronic device may identify camera driving information set in the camera and display driving information set in the display module. In order to avoid interference by light emitted from the display module when an image is photographed by the camera, the electronic device may be configured such that an image is photographed at a shutter speed set to be within an off-duty time in a duty cycle by using the duty cycle of the display. To this end, the electronic device may identify a shutter speed included in the camera driving information and an off-duty time in the duty cycle set in the display module. For example, the camera driving information may include at least one of the shutter speed, a sensor gain value, an ISO sensitivity value, and an aperture value (F) which are set in the camera. In addition to these, the camera driving information may also include other parameters related to driving the camera 210. For example, the display driving information may include at least one of a refresh rate (or screen refresh rate), duty cycle information, or brightness information which are set in the display module. In addition to these, the display driving information may also include other parameters related to driving the display module 160.

In operation 805, the electronic device may identify the priority of the display and the camera, based on the priority information set for the display and the camera, respectively, and identify whether the shutter speed is shorter than or equal to the off-duty time by comparing the shutter speed with the off-duty time. When the identified result indicates that the shutter speed is shorter than or equal to the off-duty time, the electronic device may perform operation 807. When the shutter speed is longer than the off-duty time, the electronic device may perform operation 809.

In operation 807, when the priority of the camera is set higher than the priority of the display module and the shutter speed is equal to or shorter than the off-duty time (operation 805—Yes), the electronic device may photograph an image by using the camera, based on the set display driving information and camera driving information, without adjusting at least one of the display driving information of the display module or the camera driving information of the camera. For example, when the priority of the display is set higher than the priority of the camera, the electronic device may terminate or delay image photographing by the camera or photograph an image at low quality, without adjusting at least one of the display driving information of the display module or the camera driving information of the camera, and may display guidance information related thereto on the display module 160.

In operation 809, when the priority of the camera is set higher than the priority of the display module and the shutter speed is longer than the off-duty time (operation 805—No), the electronic device may adjust at least one of the display driving information of the display module or the camera driving information of the camera. The electronic device in operation 809 may perform the same operation as the operation of adjusting (or changing) at least one of the display driving information of the display module or the camera driving information of the camera, described with reference to operation 507 in FIG. 5 and FIGS. 6A and 6B or 7A and 7B.

In operation 811, the electronic device may identify again whether the shutter speed is shorter than or equal to the off-duty time. In operation 813, when the identified result indicates that the shutter speed is shorter than or equal to the off-duty time (operation 811—Yes), the electronic device may perform image photographing by using the camera, based on at least one of the adjusted (or changed) display driving information of the display module or the adjusted (or changed) camera driving information of the camera. When the shutter speed is longer than the off-duty time, the electronic device may perform operation 815.

In operation 815, when the shutter speed is longer than the off-duty time (operation 811—No), the electronic device may change the on-duty time in the duty cycle of adjacent pixels of the display module 160 in the adjacent region 220 where the camera 210 is disposed, to set the off-duty interval of the adjacent pixels. The electronic device may maintain display driving information of pixels other than the adjacent pixels. As shown in FIGS. 9A and 9B, when the off-duty 913 time corresponding to the identified shutter speed is longer than the designated off-duty time (e.g., 8.35 ms) within a half cycle (on-duty and off-duty time) (e.g., 16.66 ms) of a duty cycle 910, the electronic device (e.g., the electronic device 101 in FIGS. 1 and 2) according to an embodiment may change only the on-duty 911 time set for the adjacent pixels to be reduced such that the off-duty 913 time is included in the time range (e.g. 33.3 ms) of the duty cycle 910, based on the identified shutter speed (e.g. 16.66 ms). For example, when the identified shutter speed (e.g., 16.66 ms) is longer than the designated off-duty time (e.g., 8.35 ms), the electronic device may change the refresh rate to, for example, 30 Hz, and change only the on-duty 911 time set for the adjacent pixels to be reduced based on the identified shutter speed (e.g., 16.66 ms). According to an embodiment, when the off-duty 915 time corresponding to the shutter speed is secured by simply reducing the on-duty 911 time of the identified refresh rate, the identified refresh rate (e.g., 60 Hz) in FIG. 9A may be maintained without being changed. According to an embodiment, as shown in FIG. 9C, when the priority of the camera 210 is higher and the identified shutter speed is longer than the identified off-duty time, the electronic device may change the on-duty 921 time of the duty cycle 920 of the adjacent pixels to the off-duty 923 time by configuring the adjacent pixels of the display module having the camera disposed thereon, to be off, and maintain display driving information of pixels other than the adjacent pixels. According to the on-duty 921 time in the duty cycle 920 of the adjacent pixels which has been changed to the off-duty 923 time, the electronic device may adjust the off-duty 923 time such that the off-duty 923 time corresponds to the time of a half cycle of the duty cycle 920 (e.g., 33.3 ms), based on the identified shutter speed. As another example, according to the on-duty 921 time in the duty cycle 920 of the adjacent pixels which has been changed to the off-duty 923 time, the electronic device may adjust the off-duty 923 time such that the off-duty 923 time is longer than the identified shutter speed and is included within the time range (e.g., 33.3 ms) of a half cycle of the duty cycle 920.

In operation 817, the electronic device may identify whether the shutter speed is shorter than or equal to the off-duty time. When the identified result indicates that the shutter speed is equal to or shorter than the off-duty time (operation 817—Yes), the electronic device may perform image photographing by using the camera, based on the off-duty time having been changed in operation 819. The changed off-duty time may be the off-duty time changed by adjusting at least one of the display driving information of the display module or the camera driving information of the camera and then further adjusting the display information of only adjacent pixels of the camera. When the identified result in operation 817 indicates that the shutter speed is longer than the off-duty time (operation 817—No), the electronic device may end the operation. For example, the electronic device may display information indicating that the image quality of the camera is not optimized on the display module.

Figure 10A:
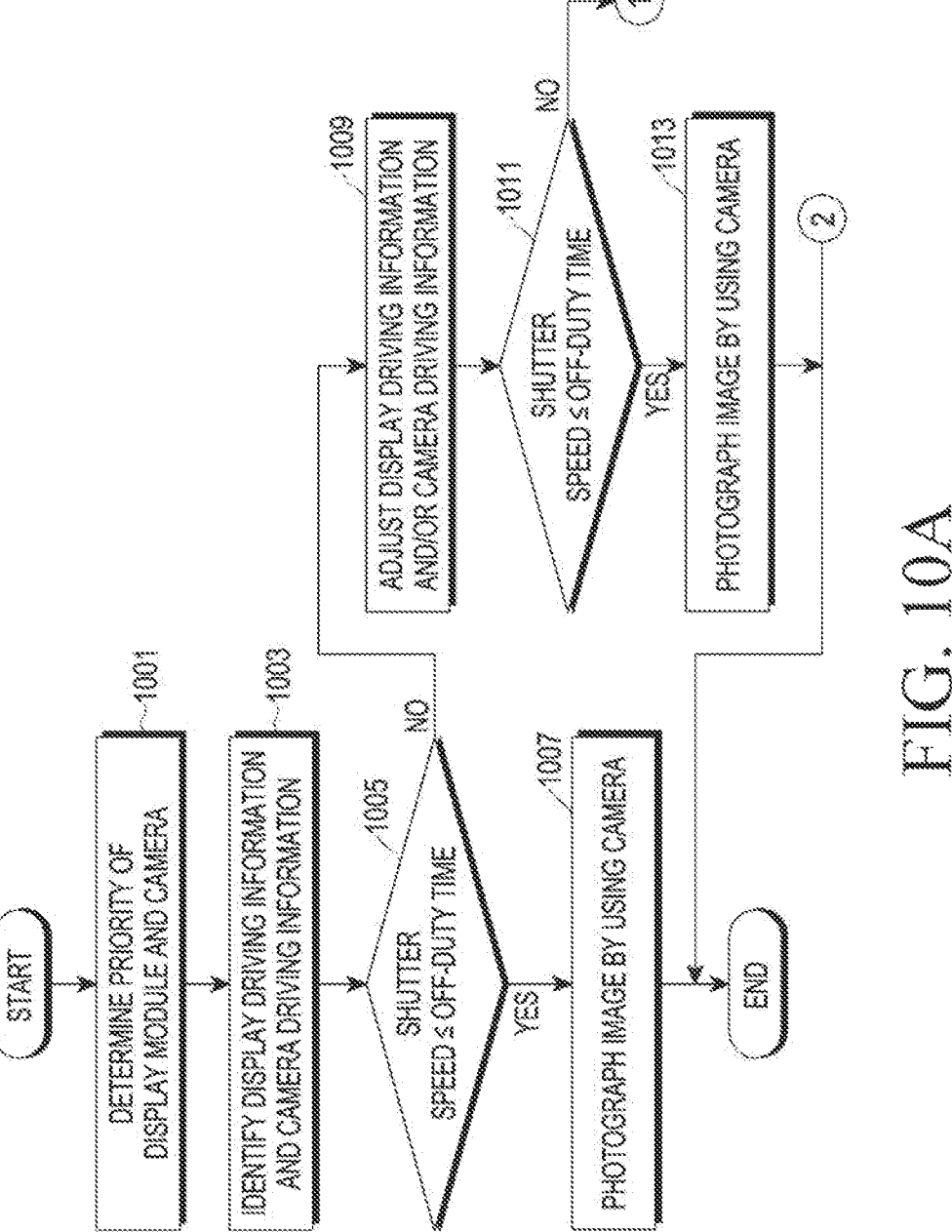
FIGS. 10A and 10B illustrate an example of a method for operating an electronic device, according to an embodiment.
Figure 10B:
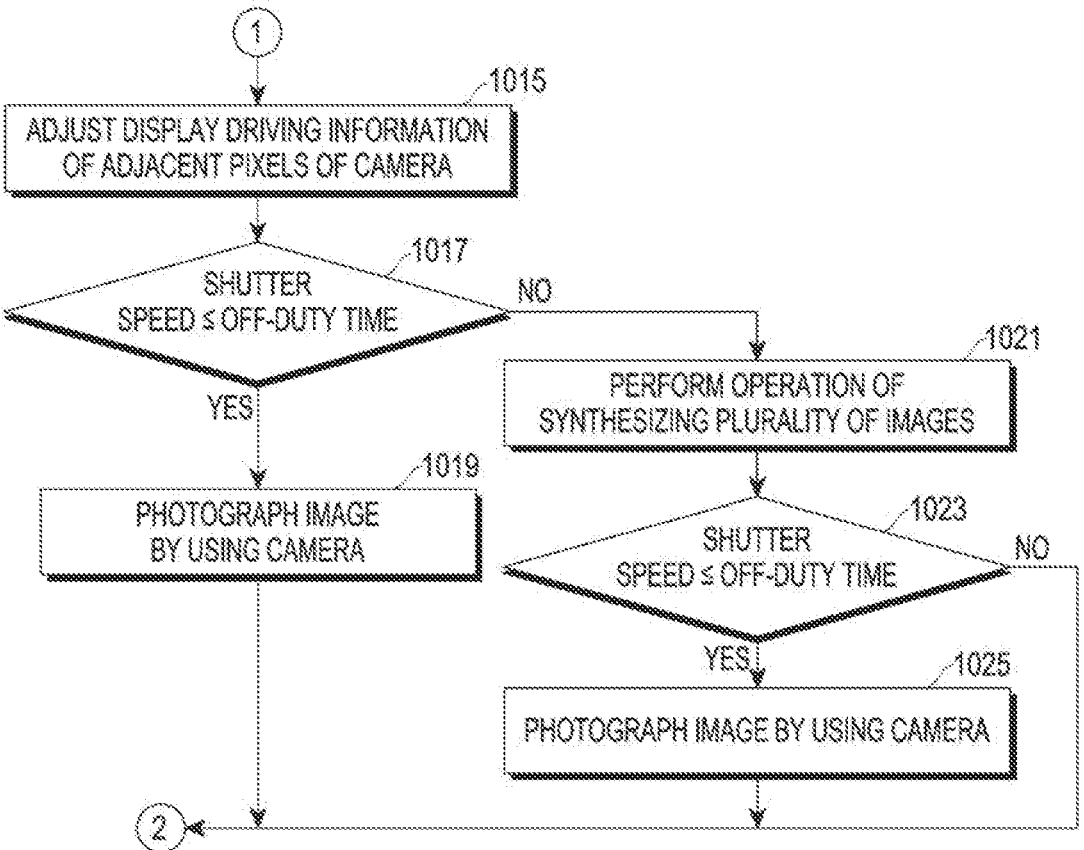

FIGS. 10A and 10B illustrate an example of a method for operating an electronic device according to an embodiment.

Referring to FIGS. 10A and 10B, in operation 1001, the electronic device (e.g., the electronic device 101 in FIGS. 1 and 2) according to an embodiment may determine priority of the display module and priority of the camera in response to a request to photograph an image using the camera (e.g., the camera module 180 in FIG. 1, the camera 210 in FIGS. 2, 3, and 4) while the display module (e.g., the display module 160 in FIGS. 1, 2, 3 and 4) is driven. For example, the electronic device may set priority information including a weight factor for each of the display module and the camera according to the determined priority. For example, the electronic device may determine the priority, based on at least one of information related to an image displayed on the display module, user preference information, user's gaze tracking information, or user's present condition information. For example, the information related to the image displayed on the display module may include information related to another screen displaying content desired by a user (e.g., user's another screen during a video call or a data screen during Internet broadcasting). The user preference information, which is a priority requested by the user, may include information indicating the priority of the display module 160 or the priority of the camera 210. The user's gaze tracking information may include information on a location toward which the user's gaze tracked using a gaze tracking function is directed.

In operation 1003, the electronic device may identify camera driving information set in the camera and display driving information set in the display module. In order to avoid interference by light emitted from the display module when an image is photographed by the camera, the electronic device may be configured such that an image is photographed at a shutter speed set to be within an off-duty time in a duty cycle by using the duty cycle of the display. To this end, the electronic device may identify a shutter speed included in the camera driving information and an off-duty time in the duty cycle set in the display module. For example, the camera driving information may include at least one of the shutter speed, a sensor gain value, an ISO sensitivity value, and an aperture value (F) which are set in the camera. In addition to these, the camera driving information may also include other parameters related to driving the camera 210. For example, the display driving information may include at least one of a refresh rate (or screen refresh rate), duty cycle information, or brightness information which are set in the display module. In addition to these, the display driving information may also include other parameters related to driving the display module 160.

In operation 1005, the electronic device may identify the priority of the display and the camera, based on the priority information set for the display and the camera, respectively, and identify whether the shutter speed is shorter than or equal to the off-duty time by comparing the shutter speed with the off-duty time. When the identified result indicates that the shutter speed is shorter than or equal to the off-duty time, the electronic device may perform operation 1007. When the shutter speed is longer than the off-duty time, the electronic device may perform operation 1009.

In operation 1007, when the shutter speed is equal to or shorter than the off-duty time (operation 1005—Yes), the electronic device may photograph an image by using the camera within the set or changed off-duty time. For example, when the result identified in operation 1005 indicates that the priority of the display is set higher and the shutter speed is equal to or shorter than the off-duty time, the electronic device may photograph an image by using the camera within the set off-duty time, based on the set display driving information and camera driving information, without adjusting at least one of the display driving information of the display module or the camera driving information of the camera. For example, when the priority of the display is set higher, the electronic device may terminate or delay image photographing by the camera or photograph an image at low quality, without adjusting at least one of the display driving information of the display module or the camera driving information of the camera, and may display guidance information related thereto on the display module 160.

In operation 1009, when the priority of the camera is set higher than the priority of the display module and the shutter speed is longer than the off-duty time (operation 1005—No), the electronic device may adjust at least one of the display driving information of the display module or the camera driving information of the camera. The electronic device in operation 1009 may perform the same operation as the operation of adjusting (or changing) at least one of the display driving information of the display module or the camera driving information of the camera, described with reference to operation 507 in FIG. 5 and FIGS. 6A and 6B or 7A and 7B.

In operation 1011, the electronic device may identify again whether the shutter speed is shorter than or equal to the off-duty time. In operation 1013, when the identified result indicates that the shutter speed is shorter than or equal to the off-duty time (operation 1011—Yes), the electronic device may photograph an image by using the camera within the changed off-duty time, based on the display driving information and/or camera driving information changed according to the adjustment of the display driving information and/or camera driving information.

In operation 1015, when the result identified in operation 1011 indicates that the shutter speed is longer than the off-duty time (operation 1011—No), the electronic device may change the on-duty time in the duty cycle of adjacent pixels of the display module 160 in the adjacent region 220 where the camera 210 is disposed, to the off-duty interval of the adjacent pixels. The electronic device may maintain display driving information of pixels other than the adjacent pixels. As shown in FIGS. 9A and 9B, when the identified shutter speed is longer than the identified off-duty, the electronic device (e.g., the electronic device 101 in FIGS. 1 and 2) according to an embodiment may change only the on-duty 911 time set for the adjacent pixels to be reduced such that the off-duty time is included in the time range (e.g. 33.3 ms) of the duty cycle 910, based on the identified shutter speed (e.g. 16.66 ms). For example, when the identified shutter speed (e.g., 16.66 ms) is longer than the identified off-duty time (e.g., 8.35 ms), the electronic device may change the refresh rate to, for example, 30 Hz, and change only the on-duty 911 time set for the adjacent pixels to be reduced based on the identified shutter speed (e.g., 16.66 ms). According to an embodiment, when the off-duty 913 time corresponding to the shutter speed is secured by simply reducing the on-duty 911 time of the identified refresh rate, the identified refresh rate may be maintained without being changed. According to an embodiment, as shown in FIG. 9C, when the priority of the camera 210 is higher and the identified shutter speed is longer than the identified off-duty time, the electronic device may change the on-duty 921 time in the duty cycle 920 of the adjacent pixels to the off-duty 923 time by configuring the adjacent pixels of the display module having the camera disposed thereon, to be off, and maintain display driving information of pixels other than the adjacent pixels. According to the on-duty 921 time in the duty cycle 920 of the adjacent pixels which has been changed to the off-duty 923 time, the electronic device may perform adjustment such that the off-duty 923 time corresponds to the time of a half cycle of the duty cycle 920 (e.g., 33.3 ms), based on the identified shutter speed. For another example, according to the on-duty 921 time in the duty cycle 920 of the adjacent pixels which has been changed to the off-duty 923 time, the electronic device may adjust the off-duty 923 time such that the off-duty 923 time is longer than the identified shutter speed and is included within the time range (e.g., 33.3 ms) of a half cycle of the duty cycle 920.

In operation 1017, the electronic device may identify again whether the shutter speed is shorter than or equal to the off-duty time. In operation 1019, when the identified result indicates that the shutter speed is equal to or shorter than the off-duty time (operation 1017—Yes), the electronic device may perform image photographing by using the camera within the off-duty time changed by adjusting the display driving information of the display module and/or the camera driving information of the camera and then further adjusting the display information of only adjacent pixels of the camera.

When the result identified in operation 1017 indicates that the shutter speed is longer than the off-duty time (operation 1017—No), the electronic device may identify that there is a difficulty in maximally securing the shutter speed set in the camera 210 within the duty cycle even with the priority of the camera being higher. Accordingly, in operation 1021, the electronic device may adjust the identified shutter speed to be short, photograph a plurality of images within the identified off-duty time at the adjusted shutter speed, and synthesize the plurality of photographed images. According to an embodiment, the quality of image photographed by the camera may be optimized by synthesizing the plurality of photographed images.

In operation 1023, the electronic device may identify again whether the shutter speed is shorter than or equal to the off-duty time. In operation 1025, when the identified result indicates that the shutter speed is shorter than or equal to the off duty time (operation 1023—Yes), an image may be photographed by the camera within the off-duty time changed based on the last changed condition. For example, the last changed condition may include display driving information and/or camera driving information changed by executing an operation of changing display driving information and/or camera driving information (e.g., operation 1009 in FIG. 10A), an operation of changing display driving information and camera driving information of only adjacent pixels of the camera (e.g., operation 1015 in FIG. 10B), and an operation of photographing and synthesizing a plurality of images (e.g., operation 1021 in FIG. 10B).

When the result identified in operation 1023 indicates that the shutter speed is longer than the off-duty time (operation 1023—No), the electronic device may end the operation.

As shown in FIGS. 10A and 10B described above, the electronic device may execute all operations of changing the display driving information and/or the camera driving information (e.g., operation 1009 in FIG. 10A), changing the display driving information and camera driving information of only adjacent pixels of the camera (e.g., operation 1015 in FIG. and photographing and synthesizing a plurality of images (e.g., operation 1021 in FIG. Without being limited thereto, the electronic device may separately execute an operation of changing the display driving information and/or the camera driving information (e.g., operation 1009 in FIG. 10), an operation of changing the display driving information and the camera driving information of only adjacent pixels of the camera (e.g., operation 1015 in FIG. 10B), and an operation of photographing and synthesizing a plurality of images (e.g., operation 1021 in FIG. 10B) or execute combination of two different operations.

According to an embodiment, a method for operating an electronic device (e.g., the electronic device 101 in FIGS. 1, 2, and 4) may include configuring priority of a display module (e.g., the display module 160 in FIGS. 1, 2, 3, and 4) and priority of a camera (e.g., the camera module 180 in FIG. 1, the camera 210 in FIGS. 2, 3, and 4) in response to a request to photograph an image using the camera disposed on the rear surface of the display module that is not exposed to the outside, in a state in which the display module of the electronic device is driven, identifying a shutter speed included in camera driving information set in the camera and an off-duty time in a duty cycle set in the display module, adjusting at least one of display driving information of the display module or the camera driving information of the camera, based on the priority of the camera being set higher than the priority of the display module and the shutter speed being identified to be longer than the off-duty time, and photographing an image by using the camera within an off-duty time that has changed based on the adjustment of at least one of the display driving information and the camera driving information.

According to an embodiment, the determining of the priority may include determining the priority, based on at least one of information related to an image displayed on the display module, user preference information, user's gaze tracking information, or user's present condition information, and the camera driving information may include at least one of the shutter speed, sensor gain, ISO sensitivity, or an aperture value which are set in the camera. The display driving information may include at least one of a refresh rate, duty cycle information, or brightness information which are set in the display module.

According to an embodiment, the method may include photographing an image by using the camera within an off-duty time set in the display module without adjusting at least one of the display driving information of the display module or the camera driving information of the camera, based on the priority of the display being set higher than the priority of the camera.

According to an embodiment, the adjusting of at least one of the display driving information of the display module or the camera driving information of the camera may include changing at least one of an on-duty time in the duty cycle or the camera driving information, based on the set duty cycle and the shutter speed, and changing the off-duty time such that the off-duty time is increased in response to a change in the on-duty time or a change in at least one of the shutter speed, sensor gain, ISO sensitivity, or an aperture value included in the camera driving information.

According to an embodiment, the adjusting of at least one of the display driving information of the display module or the camera driving information of the camera may include changing at least one of a refresh, brightness, or duty cycle included in the display driving information to a low value, based on the shutter speed.

According to an embodiment, the adjusting of at least one of the display driving information of the display module or the camera driving information of the camera may include changing an on-duty time in a duty cycle of adjacent pixels of the display module having the camera disposed thereon, and maintaining display driving information of pixels other than the adjacent pixels, wherein the on-duty time of the adjacent pixels may be changed to be optimized (e.g., reduced) based on the shutter speed.

According to an embodiment, the adjusting of at least one of the display driving information of the display module or the camera driving information of the camera may include changing at least one of a refresh rate, brightness, or duty cycle included in the display driving information to a low value, based on the shutter speed, and changing an on-duty time in a duty cycle of adjacent pixels of the display module having the camera disposed thereon such that the on-duty time is optimized (e.g., reduced).

According to an embodiment, the adjusting of at least one of the display driving information of the display module or the camera driving information of the camera may include configuring adjacent pixels of the display module having the camera disposed thereon, to be off, changing an on-duty time in a duty cycle of the adjacent pixels to an off-duty time, and maintaining display drive information of pixels other than the adjacent pixels.

According to an embodiment, the method may include adjusting the shutter speed to be short when the priority of the camera is higher and the shutter speed is longer than the priority of the display module than the off-duty time, photographing a plurality of images within the off-duty time at the adjusted shutter speed, and synthesizing the plurality of photographed images.

An embodiment may provide a non-transitory storage medium storing a program including executable instructions that, when executed by a processor, cause the processor to execute configuring priority of a display module and priority of a camera in response to a request to photograph an image using the camera disposed on the rear surface of the display module that is not exposed to the outside, in a state in which the display module of the electronic device is driven, identifying a shutter speed included in camera driving information set in the camera and an off-duty time in a duty cycle set in the display module, adjusting at least one of display driving information of the display module or the camera driving information of the camera, based on the priority of the camera being set higher than the priority of the display module and the shutter speed being identified to be longer than the off-duty time, and photographing an image by using the camera within an off-duty time that has changed based on the adjustment of at least one of the display driving information and the camera driving information.

The embodiments disclosed herein are merely presented for explanation and understanding of the disclosed technical content, and are not intended to limit the scope of the technology described herein. Therefore, the scope of the document should be construed to include all changes or various other embodiments based on the technical idea of the document.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a display;
a camera provided on a rear surface of the display that is not exposed to the outside;
memory configured to store instructions; and
at least one processor including a processing circuitry,
wherein the instructions, when executed by the at least one processor individually or collectively, cause the electronic device to:
   based on receiving a request to photograph an image using the camera in a state in which the display is driven, set a priority of the display and a priority of the camera;
   identify a shutter speed included in camera driving information set in the camera and an off-duty time in a duty cycle set in the display;
   based on the priority of the camera being set higher than the priority of the display and the shutter speed being identified to be longer than the off-duty time, adjust at least one of display driving information of the display or the camera driving information of the camera; and
   control the camera to photograph an image within an off-duty time that has changed based on the adjusted at least one of the display driving information or the camera driving information.

2. The electronic device of claim 1, wherein the instructions, when executed by the at least one processor individually or collectively, cause the electronic device to:
   determine the priority based on at least one of information related to an image displayed on the display, user preference information, user gaze tracking information, or user present condition information; and based on the priority of the display being set higher than the priority of the camera, control the camera to photograph an image within an off-duty time set in the display without adjusting at least one of the display driving information of the display or the camera driving information of the camera, wherein the camera driving information comprises at least one of the shutter speed, sensor gain, ISO sensitivity, or an aperture value, which are set in the camera, and wherein the display driving information comprises at least one of a refresh rate, duty cycle information, or brightness information, which are set in the display.

3. The electronic device of claim 1, wherein the instructions, when executed by the at least one processor individually or collectively, cause the electronic device to change at least one of an on-duty time in the duty cycle or, based on the shutter speed being longer than the off-duty time, the camera driving information, and wherein the instructions, when executed by the at least one processor individually or collectively, cause the electronic device to, based on the change in the on-duty time in the duty cycle or a change in at least one of the shutter speed, sensor gain, ISO sensitivity, or an aperture value included in the camera driving information, change the off-duty time to increase the off-duty time.

4. The electronic device of claim 1, wherein the instructions, when executed by the at least one processor individually or collectively, cause the electronic device to:

based on the identified shutter speed being longer than the off-duty time, change an on-duty time in a duty cycle of adjacent pixels of the display on which the camera is provided; and maintain display driving information of pixels other than the adjacent pixels, and wherein the on-duty time of the adjacent pixels is reduced based on the shutter speed.

5. The electronic device of claim 1, wherein the instructions, when executed by the at least one processor individually or collectively, cause the electronic device to:

based on the shutter speed being longer than the off-duty time, change at least one of a refresh rate, brightness, or a duty cycle included in the display driving information to a low value, based on the shutter speed; and change an on-duty time in a duty cycle of adjacent pixels of the display on which the camera is provided by reducing the on-duty time.

6. The electronic device of claim 1, wherein the instructions, when executed by the at least one processor individually or collectively, cause the electronic device to:

based on the shutter speed being longer than the off-duty time, set adjacent pixels of the display on which the camera is provided to be off, and change an on-duty time in a duty cycle of the adjacent pixels to the off-duty time; and maintain display driving information of pixels other than the adjacent pixels.

7. The electronic device of claim 1, wherein the instructions, when executed by the at least one processor individually or collectively, cause the electronic device to:

adjust the shutter speed to be short based on the shutter speed being longer than the off-duty time;

photograph a plurality of images within the off-duty time at the adjusted shutter speed; and synthesize the photographed plurality of images.

8. A method for operating an electronic device, the method comprising:

based on receiving a request to photograph an image using a camera provided on a rear surface of a display that is not exposed to the outside, in a state in which the display is driven, setting a priority of the display and a priority of the camera;

identifying a shutter speed included in camera driving information set in the camera and an off-duty time in a duty cycle set in the display;

based on the priority of the camera being set higher than the priority of the display and the shutter speed being identified to be longer than the off-duty time, adjusting at least one of display driving information of the display or the camera driving information of the camera; and photographing an image by using the camera within an off-duty time that has changed based on the adjusted at least one of the display driving information and the camera driving information.

9. The method of claim 8, wherein the setting the priority comprises determining the priority based on at least one of information related to an image displayed on the display, user preference information, user gaze tracking information, or user present condition information, wherein the method further comprises, based on the priority of the display being set higher than the priority of the camera, photographing an image by using the camera within an off-duty time set in the display without adjusting at least one of the display driving information of the display or the camera driving information of the camera, wherein the camera driving information comprises at least one of the shutter speed, sensor gain, ISO sensitivity, or an aperture value which are set in the camera, and wherein the display driving information comprises at least one of a refresh rate, duty cycle information, or brightness information which are set in the display.

10. The method of claim 8, wherein the adjusting of at least one of the display driving information of the display or the camera driving information of the camera comprises:

changing at least one of an on-duty time in the duty cycle or, based on the shutter speed being longer than the off-duty time, the camera driving information; and based on the change in the on-duty time in the duty cycle or a change in at least one of the shutter speed, sensor gain, ISO sensitivity, or an aperture value included in the camera driving information, changing the off-duty time to increase the off-duty time.

11. The method of claim 8, wherein the adjusting of at least one of the display driving information of the display or the camera driving information of the camera comprises:

based on the identified shutter speed being longer than the off-duty time, changing an on-duty time in a duty cycle of adjacent pixels of the display on which the camera is provided; and maintaining display driving information of pixels other than the adjacent pixels, and wherein the on-duty time of the adjacent pixels is reduced based on the shutter speed.

12. The method of claim 8, wherein the adjusting of at least one of the display driving information of the display or the camera driving information of the camera comprises:

based on the shutter speed being longer than the off-duty time, changing at least one of a refresh rate, brightness, or a duty cycle included in the display driving information to a low value; and changing an on-duty time in a duty cycle of adjacent pixels of the display on which the camera is provided by reducing the on-duty time.

13. The method of claim 8, wherein the adjusting of at least one of the display driving information of the display or the camera driving information of the camera comprises:

setting adjacent pixels of the display on which the camera is provided to be off;

changing an on-duty time in a duty cycle of the adjacent pixels to the off-duty time; and maintaining display driving information of pixels other than the adjacent pixels.

14. The method of claim 8, further comprising:

adjusting the shutter speed to be short based on the priority of the camera being higher than the priority of the display and the shutter speed being longer than the off-duty time;

photographing a plurality of images within the off-duty time at the adjusted shutter speed; and synthesizing the photographed plurality of images.

15. A non-transitory storage medium storing a program comprising executable instructions that, when executed by at least one processor of an electronic device, cause the electronic device to execute a method comprising:

based on receiving a request to photograph an image using a camera provided on a rear surface of a display that is not exposed to the outside, in a state in which the display is driven, setting a priority of the display and a priority of the camera;

identifying a shutter speed included in camera driving information set in the camera and an off-duty time in a duty cycle set in the display;

based on the priority of the camera being set higher than the priority of the display and the shutter speed being identified to be longer than the off-duty time, adjusting at least one of display driving information of the display or the camera driving information of the camera; and photographing an image by using the camera within an off-duty time that has changed based on the adjusted at least one of the display driving information and the camera driving information.

16. An electronic device comprising:

memory configured to store instructions; and at least one processor including a processing circuitry, wherein the instructions, when executed by the at least one processor individually or collectively, cause the electronic device to:

based on receiving a request to photograph an image using a camera in a state in which a display is driven, set a priority of the display and a priority the camera;

identify a shutter speed included in camera driving information set in the camera and an off-duty time in a duty cycle set in the display;

based on the priority of the camera being set higher than the priority of the display and the shutter speed being identified to be longer than the off-duty time, adjust at least one of display driving information of the display or the camera driving information of the camera; and control the camera to photograph an image within an off-duty time that has changed based on the adjusted at least one of the display driving information or the camera driving information.

17. The electronic device of claim 16, wherein the instructions, when executed by the at least one processor individually or collectively, cause the electronic device to:

determine the priority based on at least one of information related to an image displayed on the display, user preference information, user gaze tracking information, or user present condition information; and based on the priority of the display being set higher than the priority of the camera, control the camera to photograph an image within an off-duty time set in the display without adjusting at least one of the display driving information of the display or the camera driving information of the camera, wherein the camera driving information comprises at least one of the shutter speed, sensor gain, ISO sensitivity, or an aperture value, which are set in the camera, and wherein the display driving information comprises at least one of a refresh rate, duty cycle information, or brightness information, which are set in the display.

18. The electronic device of claim 16, wherein the instructions, when executed by the at least one processor individually or collectively, cause the electronic device to change at least one of an on-duty time in the duty cycle or, based on the shutter speed being longer than the off-duty time, the camera driving information, and wherein the instructions, when executed by the at least one processor individually or collectively, cause the electronic device to, based on the change in the on-duty time in the duty cycle or a change in at least one of the shutter speed, sensor gain, ISO sensitivity, or an aperture value included in the camera driving information, change the off-duty time to increase the off-duty time.

19. The electronic device of claim 16, wherein the instructions, when executed by the at least one processor individually or collectively, cause the electronic device to:

based on the identified shutter speed being longer than the off-duty time, change an on-duty time in a duty cycle of adjacent pixels of the display on which the camera is provided; and maintain display driving information of pixels other than the adjacent pixels, and wherein the on-duty time of the adjacent pixels is reduced based on the shutter speed.

20. The electronic device of claim 16, wherein the instructions, when executed by the at least one processor individually or collectively, cause the electronic device to:

based on the shutter speed being longer than the off-duty time, change at least one of a refresh rate, brightness, or a duty cycle included in the display driving information to a low value, based on the shutter speed; and change an on-duty time in a duty cycle of adjacent pixels of the display on which the camera is provided by reducing the on-duty time.

* * * * *